United States Patent
Read et al.

(10) Patent No.: US 10,131,732 B2
(45) Date of Patent: Nov. 20, 2018

(54) METHOD TO PRODUCE FUNCTIONALIZED, LOW VISCOSITY ETHYLENE-BASED POLYMERS

(71) Applicant: Dow Global Technologies LLC, Midland, MI (US)

(72) Inventors: Michael D. Read, Midland, MI (US); Santosh S. Bawiskar, Freeport, TX (US)

(73) Assignee: Dow Global Technologies LLC, Midland, MI (US)

(*) Notice: Subject to any disclaimer, the term of this patent is extended or adjusted under 35 U.S.C. 154(b) by 0 days.

(21) Appl. No.: 15/101,343

(22) PCT Filed: Dec. 16, 2014

(86) PCT No.: PCT/US2014/070647
§ 371 (c)(1),
(2) Date: Jun. 2, 2016

(87) PCT Pub. No.: WO2015/102886
PCT Pub. Date: Jul. 9, 2015

(65) Prior Publication Data
US 2016/0304650 A1    Oct. 20, 2016

Related U.S. Application Data

(60) Provisional application No. 61/922,003, filed on Dec. 30, 2013.

(51) Int. Cl.
*C08K 5/14* (2006.01)
*C08F 255/02* (2006.01)
*C08K 5/092* (2006.01)

(52) U.S. Cl.
CPC ............ *C08F 255/02* (2013.01); *C08K 5/092* (2013.01); *C08K 5/14* (2013.01)

(58) Field of Classification Search
CPC .... C08F 8/06; C08F 8/46; C08F 10/02; C08F 2810/10
See application file for complete search history.

(56) References Cited

U.S. PATENT DOCUMENTS

| | | |
|---|---|---|
| 3,645,992 A | 2/1972 | Elston |
| 4,076,698 A | 2/1978 | Anderson et al. |
| 4,134,927 A * | 1/1979 | Tomoshige .......... C08F 255/02 525/245 |
| 5,272,236 A | 12/1993 | Lai et al. |
| 5,278,272 A | 1/1994 | Lai et al. |
| 6,054,544 A | 4/2000 | Finlayson et al. |
| 6,335,410 B1 | 1/2002 | Finlayson et al. |
| 6,723,810 B2 | 4/2004 | Finlayson et al. |
| 7,897,689 B2 | 3/2011 | Harris et al. |
| 2005/0059783 A1* | 3/2005 | Furrer ..................... C08F 8/42 525/333.7 |
| 2006/0199914 A1* | 9/2006 | Harris ................. C08F 210/16 525/242 |
| 2011/0003942 A1 | 1/2011 | Tsukui et al. |

FOREIGN PATENT DOCUMENTS

| | | |
|---|---|---|
| WO | 2006039774 A1 | 4/2006 |
| WO | 2006/102016 A2 | 9/2006 |
| WO | 2007146875 A2 | 12/2007 |

OTHER PUBLICATIONS

Perkadox data sheet (2017). (Year: 2017).*
Bawiskar, International Polymer Processing, 1997, vol. 12, No. 4, pp. 331-340.
PCT/US2014/070647, International Search Report and Written Opinion dated Aug. 24, 2015.
PCT/US2014/070647, International Preliminary Report on Patentability dated Jul. 14, 2016.

* cited by examiner

*Primary Examiner* — Robert C Boyle
(74) *Attorney, Agent, or Firm* — Husch Blackwell LLP

(57) ABSTRACT

The invention provides a process to form a "functionalized ethylene-based polymer" from an ethylene-based polymer and at least one polar compound, said process comprising thermally treating a composition comprising the ethylene-based polymer, the at least one polar compound, and at least one peroxide, in at least one extruder comprising at least one barrel, to form a polymer melt; and wherein the at least one peroxide has a half life, at the maximum barrel temperature of the at least one extruder, of less than of the minimum residence time of the polymer melt in the at least one extruder. The invention further provides a composition comprising at least the following: a) an ethylene-based polymer comprising a melt viscosity, at 350° F. (177° C.), less than 50.000 cP, and b) at least one peroxide comprising a half-life from 0.10 to 2.00 minutes, at a temperature from 160° C. to 190° C.

9 Claims, 2 Drawing Sheets

US 10,131,732 B2

METHOD TO PRODUCE FUNCTIONALIZED, LOW VISCOSITY ETHYLENE-BASED POLYMERS

REFERENCE TO RELATED APPLICATIONS

The present application claims the benefit of U.S. Provisional Application No. 61/922,003, filed Dec. 30, 2013, incorporated by reference.

BACKGROUND

During reactive extrusion, low molecular weight, low viscosity ethylene-based polymers have lower melt temperatures, due to less viscous energy dissipation, as compared to higher molecular weight, higher viscosity polymers. As a consequence, long extruders are required to raise melt temperatures to induce peroxide initiated grafting.

Grafting low molecular weight ethylene-based polymers currently requires high extruder length to diameter (L/D) ratios (>60 L/D, and preferably >80 L/D). This can be achieved using two tandem extruders (for example, 40 L/D each). At low melt temperatures, typical peroxides have half lives that are too long for a standard reactive extrusion process. Thus, a significant portion of the length of the extruder is needed to heat the low viscosity polymer to a temperature where the peroxide can decompose, and induce radicals for appreciable grafting onto the polymer. However, a problem arises in the pelletization of these grafted polymers. At the temperature where grafting occurs (>200° C. for typical peroxides), the low viscosity grafted polymers have very low melt strength, and cannot be pelletized underwater. As a result, a significant length of the extruder is required to cool the grafted-polymer melt to low enough temperatures for pelletization. Grafted polymers and/or extrusion processes are described in the following references: WO 2007/146875 and WO 2006/039774. However, there remains a need for new grafting processes for low molecular weight ethylene-based polymers. These needs have been met by the following invention.

SUMMARY OF THE INVENTION

The invention provides a process to form a "functionalized ethylene-based polymer" from an ethylene-based polymer and at least one polar compound, said process comprising thermally treating a composition comprising the ethylene-based polymer, the at least one polar compound, and at least one peroxide, in at least one extruder comprising at least one barrel, to form a polymer melt; and wherein the at least one peroxide has a half life, at the maximum barrel temperature of the at least one extruder, of less than ¼ of the minimum residence time of the polymer melt in the at least one extruder.

The invention also provides a composition comprising at least the following:

a) an ethylene-based polymer comprising a melt viscosity at 350° F. (177° C.) less than 50.000 cP, and b) at least one peroxide comprising a half-life from 0.10 to 2.00 minutes, at a temperature from 160° C. to 190° C.

DETAIL DESCRIPTION

Figure 1:
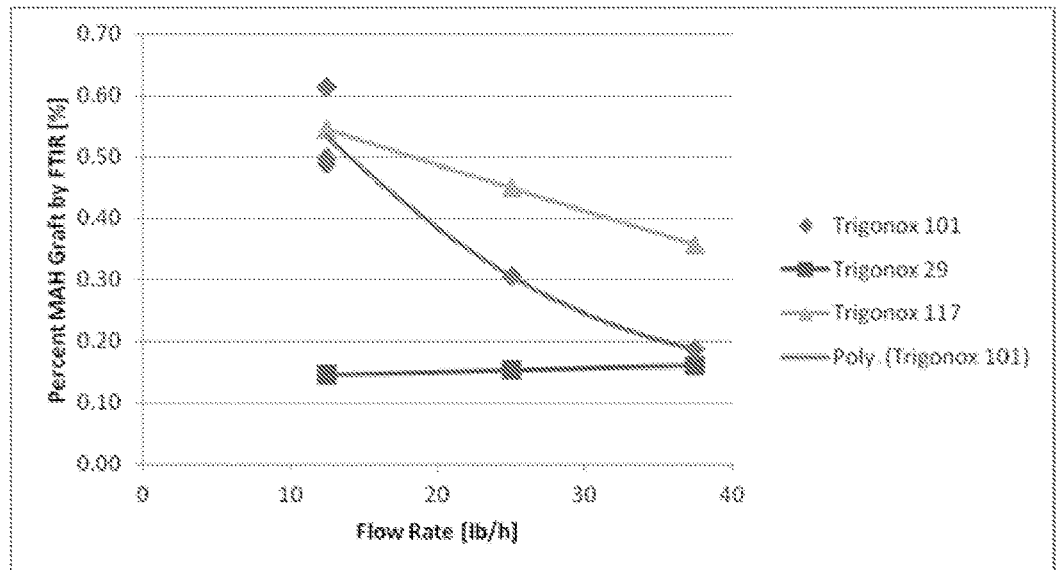
FIG. 1 depicts the percent MAH graft level as a function of peroxide type and flow rate at high barrel temperatures (defined in Tables 2A and 2B).

It has been discovered that the inventive process provides for improved pelletization of functionalized ethylene-based polymers, formed from low viscosity ethylene-based polymers. It has also been discovered that the functionalization reaction of low viscosity, ethylene-based polymers can occur at lower melt temperatures, and thus, less cooling of the polymer melt is needed for underwater pelletization. It has also been discovered that the invented process provides sufficient functionalization levels using shorter L/D extruders.

As discussed above, the invention provides a process to form a "functionalized ethylene-based polymer" from an ethylene-based polymer and at least one polar compound, said process comprising thermally treating a composition comprising the ethylene-based polymer, the at least one polar compound, and at least one peroxide, in at least one extruder comprising at least one barrel, to form a polymer melt; and wherein the at least one peroxide has a half life, at the maximum barrel temperature of the at least one extruder, of less than ¼ of the minimum residence time of the polymer melt in the at least one extruder.

An inventive process may comprise a combination of two or more embodiments as described herein.

In one embodiment, the peroxide has a half life, at the maximum barrel temperature of the at least one extruder, of less than ⅕ of the minimum residence time, and further less than ⅙ of the minimum residence time, of the polymer melt in the at least one extruder.

In one embodiment, the extruder comprises at least two barrel sections.

In one embodiment, the extruder comprises at least two barrel sections in a modular extruder.

In one embodiment, the peroxide decomposes into at least one primary radical selected from the following radicals: a) RCOO., wherein R is an alkyl, and further a C1-C6 alkyl; b) RO., wherein R is an alkyl, and further a C1-C6 alkyl; or c) ROC(O)O., wherein R is an alkyl, and further a C1-C6 alkyl.

In one embodiment, the peroxide decomposes into one or more primary radicals (Z.), and wherein the energy of each radical is greater than, or equal to, 100 kcal/mole.

The larger energy differential between the radical and the hydrogen on the polymer to be abstracted is preferred. See P. R. Dluzneski, "Peroxide Vulcanization of Elastomers", Rubber Chemistry and Technology, Volume 74, page 452.

In one embodiment, the ethylene-based polymer has a melt viscosity at 350° F. (177° C.) less than 50,000 cP, further less than 40,000 cP.

In one embodiment, the peroxide has an SADT is less than, or equal to, 80° C., further less than, or equal to, 75° C., further less than, or equal to, 70° C. The SADT refers to that of a pure peroxide (pure >90% wt % peroxide).

In one embodiment, the pure peroxide has an SADT is greater than, or equal to, 50° C., further greater than, or equal to, 55° C., further greater than, or equal to, 60° C.

In one embodiment, the pure peroxide has an SADT from 55° C. to 90° C., further from 55° C. to 80° C. (pure >90% wt % peroxide).

In one embodiment, the pure peroxide has a half-life from 0.10 to 2.00 minutes, further from 0.10 to 1.00 minutes, further from 0.10 to 0.50 minutes, at a temperature from 160° C. to 190° C., further from 170° C. to 190° C.

In one embodiment, the peroxide has a half-life less than 30 seconds, further less than 25 seconds, further less than 20 seconds, at a temperature from 160° C. to 190° C., further from 170° C. to 190° C.

In one embodiment, the peroxide has a half-life less than 30 seconds, further less than 25 seconds, further less than 20 seconds, at a temperature from 160° C. to 200° C., further from 170° C. to 195° C.

In one embodiment, the peroxide has a half-life less than 20 seconds, further less than 15 seconds, further less than 10 seconds, at a temperature from 160° C. to 190° C., further from 170° C. to 190° C. In one embodiment, the temperature of the polymer melt is from 160° C. to 190° C., further from 170° C. to 190° C.

In one embodiment, the peroxide has a half-life less than 20 seconds, further less than 15 seconds, further less than 10 seconds, at a temperature from 160° C. to 200° C., further from 170° C. to 195° C. in one embodiment, the temperature of the polymer melt is from 160° C. to 200° C., further from 170° C. to 195° C.

In one embodiment, the peroxide has a half-life from 1 second to less than 30 seconds, further from 1 second to less than 25 seconds, further from 1 second to less than 20 seconds, at a temperature from 160° C. to 190° C., further from 170° C. to 190° C.

In one embodiment, the peroxide has a half-life from 1 second to less than 30 seconds, further from 1 second to less than 25 seconds, further from 1 second to less than 20 seconds, at a temperature from 160° C. to 200° C., further from 170° C. to 195° C.

In one embodiment, the peroxide has a half-life from 1 second to less than 20 seconds, further from 1 second to less than 15 seconds, further from 1 second to less than 10 seconds, at a temperature from 160° C. to 190° C., further from 170° C. to 190° C.

In one embodiment, the peroxide has a half-life from 1 second to less than 30 seconds, further from 1 second to less than 25 seconds, further from 1 second to less than 20 seconds, at a temperature from 160° C. to 200° C., further from 170° C. to 195° C.

Suitable peroxides include, but are not limited to, TRIGONOX 131 (tert-amylperoxy 2-ethylhexylcarbonate, CAS #70833-40-6); TRIGONOX 117; and TRIGONOX 42S (tert-butylperoxy-3,5,5 trimethylhexanoate, CAS#13122-18-4).

A peroxide may comprise a combination of two or more embodiments as described herein.

In one embodiment, the ethylene-base polymer is an ethylene/α-olefin interpolymer, and wherein the α-olefin is a $C_3$-$C_{20}$ α-olefin, further a $C_3$-$C_{10}$ α-olefin.

In one embodiment, the at least one polar compound is an anhydride-containing compound (for example, maleic anhydride) and/or carboxylic acid-containing compound (for example, maleic acid). In a further embodiment, the composition further comprises a ketone. In a further embodiment, the weight ratio of the polar compound to the ketone is from 0.80 to 1.20, further from 0.90 to 1.20, further from 1.00 to 1.20.

The invention also provides a composition comprising at least the following:

a) an ethylene-based polymer comprising a melt viscosity at 350° F. (177° C.) less than 50.000 cP, and b) at least one peroxide comprising a half-life from 0.10 to 2.00 minutes, at a temperature from 160° C. to 190° C., further from 170° C. to 190° C.

An inventive composition may comprise combinations of two or more embodiments as described herein.

In one embodiment, the peroxide decomposes into at least one primary radical selected from the following radicals: a) RCOO., wherein R is an alkyl, and further a C1-C6 alkyl; b) RO., wherein R is an alkyl, and further a C1-C6 alkyl; or c) ROC(O)O., wherein R is an alkyl, and further a C1-C6 alkyl.

In one embodiment, the peroxide decomposes into one or more primary radicals (Z.), and wherein the energy of each radical is greater than, or equal to, 100 kcal/mole.

In one embodiment, the ethylene-based polymer has a melt viscosity at 350° F. (177° C.) less than 40,000 cP, further less than 30,000 cP.

In one embodiment, the peroxide has an SADT is less than, or equal to, 80° C., further less than, or equal to, 75° C., further less than, or equal to, 70° C. The SADT refers to that of a pure peroxide (pure >90% wt % peroxide).

In one embodiment, the pure peroxide has an SADT is greater than, or equal to, 50° C., further greater than, or equal to, 55° C., further greater than, or equal to, 60° C.

In one embodiment, the pure peroxide has an SADT from 55° C. to 90° C., further from 55° C. to 80° C. (pure >90% wt % peroxide).

In one embodiment, the pure peroxide has a half-life from 0.10 to 2.00 minutes, further from 0.10 to 1.00 minutes, further from 0.10 to 0.50 minutes, at a temperature from 160° C. to 190° C., further from 170° C. to 190° C.

In one embodiment, the peroxide has a half-life less than 30 seconds, further less than 25 seconds, further less than 20 seconds, at a temperature from 160° C. to 190° C., further from 170° C. to 190° C.

In one embodiment, the peroxide has a half-life less than 15 seconds, further less than 10 seconds, at a temperature from 160° C. to 190° C., further from 170° C. to 190° C.

In one embodiment, the temperature of the polymer melt is from 160° C. to 190° C., further from 170° C. to 190° C.

Suitable peroxides include, but are not limited to, TRIGONOX 131 (tert-amyl-peroxy-2-ethylhexylcarbonate, CAS #70833-40-6); TRIGONOX 117; and TRIGONOX 42S (tert-butylperoxy 3,5,5 trimethylhexanoate, CAS#13122-18-4).

A peroxide may comprise a combination of two or more embodiments as described herein.

In one embodiment, the ethylene-base polymer is an ethylene/α-olefin interpolymer, and wherein the α-olefin is a $C_3$-$C_{20}$ α-olefin, further a $C_3$-$C_{10}$ α-olefin.

In one embodiment, the composition further comprises a polar compound. In a further embodiment, the at least one polar compound is an anhydride-containing compound (for example, maleic anhydride) and/or carboxylic acid-containing compound (for example, maleic acid). In a further embodiment, the composition further comprises a ketone. In a further embodiment, the weight ratio of the polar compound to the ketone is from 0.80 to 1.20, further from 0.90 to 1.20, further from 1.00 to 1.20.

The invention also provides an article comprising at least one component formed from an inventive composition.

In one embodiment, the article is selected from a film, a fiber, a foam, a molded part, a coating, an adhesive, or a dispersion.

In one embodiment, the article is selected from an automotive part, an adhesive, a computer part, a roofing material, a construction material, a carpet component, or a footwear component.

Polar Compound

The term "polar compound," as used herein, refers to an organic compound comprising at least one heteroatom (for example, O, N, S, P).

Examples of polar compounds include, but are not limited to, ethylenically unsaturated carboxylic acids such as maleic acid, fumaric acid, itaconic acid, acrylic acid, methacrylic acid, and crotonic acid; acid anhydrides such as maleic anhydride and itaconic anhydride; vinyl benzyl halides such as vinyl benzyl chloride and vinyl benzyl bromide; alkyl acrylates and methacrylates such as methyl acrylate, ethyl acrylate, butyl acrylate, lauryl acrylate, methyl methacrylate, ethyl methacrylate, butyl methacrylate, and lauryl methacrylate; and ethylenically unsaturated oxiranes, such as glycidyl acrylate, glycidyl methacrylate, and glycidyl ethacrylate. Preferred ethylenically unsaturated amine-reactive compounds include maleic anhydride, acrylic acid, methacrylic acid, glycidyl acrylate, glycidyl methacrylate, with maleic anhydride being more preferred. See also, U.S. Pat. No. 7,897,689 (column 51 through column 54).

In one embodiment, the polar compound is a carbonyl-containing compound, which is selected from the group consisting of maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

In one embodiment, the polar compound is an anhydride-containing and/or carboxylic acid-containing compound. In a further embodiment, the polar compound is maleic anhydride. In a further embodiment, the composition further comprises a ketone. In a further embodiment, the weight ratio of the polar compound to the ketone is from 0.80 to 1.20, further from 0.90 to 1.20, further from 1.00 to 1.20.

In one embodiment, the polar compound is a silane, and further a vinyltrialkoxysilane, for example, vinyltrimethoxysilane or vinyltriethoxysilane.

In one embodiment, the polar compound has a molecular weight from 50 to 500 g/mole, further from 80 to 400 g/mole, further from 100 to 300 g/mole.

A polar compound may comprise a combination of two or more embodiments described herein.

Extrusion

Examples of an extruder include, but are not limited to, co-rotating intermeshing twin screw extruders, counter-rotating twin screw extruders, tangential twin screw extruders, Buss Kokneader extruders, planetary extruders and single screw extruders. Specific examples include co-rotating intermeshing twin screw extruders. Further, features of interest are design specifications—length/diameter (L/D ratio), mixing sections (screw design). Typically, with a single extruder, the maximum L/D ratio possible is about 60. For longer L/D ratios, two extruders are coupled. Screw designs include, but are not limited to, those comprising of mixing elements, like kneading disc blocks, left handed screw elements, turbine mixing elements, gear mixing elements etc., and combinations made thereof.

In one embodiment, the L/D ratio of the extruder is from 36 to 80 L/D.

In one embodiment, the temperature of the polymer melt is from 130° C. to 220° C. In one embodiment, the temperature of the polymer melt is from 130° C. to 190° C., further from 130° C. to 180° C.

In one embodiment, a cooling device, such as a melt cooler, is attached to the extruder to bring down the temperature of the polymer melt.

In one embodiment, a devolatilization apparatus is attached to the extruder to remove residual reactants.

In one embodiment, the functionalized ethylene-based polymer comprises from 0.01 to 3.00 wt %, further from 0.02 to 2.50 wt %, further from 0.03 to 2.00 wt % grafted polar compound, based on the weight of the functionalized ethylene-based polymer. In a further embodiment, the functionalized ethylene-based polymer is a maleic anhydride grafted ethylene-based polymer.

Modern extruders, both modular and single barrel, have capability of temperature control across various sections. It is therefore possible to set and control different barrel temperatures along the length of the barrel. The maximum barrel temperature is the highest set temperature. Different barrel temperatures are desirable to control polymer pellet and melt temperature along the length of the extruder.

Extruder barrels house the screws or rotors of the extruder. They serve to contain the polymer in the extruder, and are designed to provide heating or cooling to the polymer being processed through heaters and cooling channels. They are designed to withstand high temperatures and pressures encountered during the extrusion operation.

Functionalized Ethylene-Based Polymer

The term "functionalized ethylene-based polymer," as used herein, refers to an ethylene-based polymer that comprises at least one chemical group (chemical substituent), linked by a covalent bond, and which group comprises at least one hetero-atom. A heteroatom is defined as an atom which is not carbon or hydrogen. Common heteroatoms include, but are not limited to, oxygen, nitrogen, sulfur, phosphorus.

Some examples of compounds that can be grafted onto the ethylene-based polymer include ethylenically unsaturated carboxylic acids and acid derivatives, such as esters, anhydrides, and acid salts. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and mixtures thereof. Maleic anhydride is a preferred compound.

In one embodiment, the functionalized ethylene-based polymer comprises at least one functional group selected from the following:

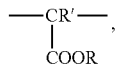

anhydride, and combinations thereof; and wherein R is hydrogen or alkyl, R' is hydrogen or alkyl. In a further embodiment, each alkyl group is, independently, methyl, ethyl, propyl or butyl. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer comprises anhydride; and further maleic anhydride. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer is a maleic anhydride-grafted polymer. In one embodiment, the functionalized ethylene-based polymer is selected from a functionalized ethylene homopolymer or a functionalized ethylene/alpha-olefin interpolymer. In a further embodiment, the functionalized ethylene-based polymer is a functionalized ethylene homopolymer. In another embodiment, the functionalized ethylene-based polymer is a functionalized ethylene/alpha-olefin interpolymer, and further a functionalized ethylene/alpha-olefin copolymer. Preferred alpha-olefins include C3-C8 alpha-olefins, and further propylene, 1-butene, 1-hexene and 1-octene.

In one embodiment, the functionalized ethylene-based polymer has a melt viscosity less than, or equal to, 40,000 cP, further less than, or equal to, 30,000 cP, further less than, or equal to, 20,000 cP, and further less than, or equal to, 15,000 cP, at 350° F. (177° C.). In a further embodiment, the functionalized ethylene-based polymer is an anhydride and/or carboxylic acid functionalized ethylene-based polymer. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a melt viscosity greater than, or equal to, 2,000 cP, further greater than, or equal to, 3,000 cP, further greater than, or equal to, 4,000 cP, and further greater than, or equal to, 5,000 cP, at 350° F. (177° C.). In a further embodiment, the functionalized ethylene-based polymer is an anhydride and/or carboxylic acid functionalized ethylene-based polymer. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a melt viscosity from 2,000 cP to 50,000 cP, further from 3,000 cP to 40,000 cP, further from 4,000 cP to 30,000 cP, at 350° F. (177° C.), and further from 5,000 cP to 20,000 cP, at 350° F. (177° C.). In a further embodiment, the functionalized ethylene-based polymer is an anhydride and/or carboxylic acid functionalized ethylene-based polymer. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a molecular weight distribution (Mw/Mn) less than, or equal to, 5.0, further less than, or equal to, 4.0, further less than, or equal to, 3.5, and further less than, or equal to, 3.2. In a further embodiment, the functionalized ethylene-based polymer is an anhydride and/or carboxylic acid functionalized ethylene-based polymer. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a molecular weight distribution (Mw/Mn) less than, or equal to, 3.0, further less than, or equal to, 2.9, further less than, or equal to, 2.8. In a further embodiment, the functionalized ethylene-based polymer is an anhydride and/or carboxylic acid functionalized ethylene-based polymer. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a molecular weight distribution (Mw/Mn) greater than, or equal to, 1.1, further greater than, or equal to, 1.3, and further greater than, or equal to, 1.5. In a further embodiment, the functionalized ethylene-based polymer is an anhydride and/or carboxylic acid functionalized ethylene-based polymer. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a molecular weight distribution (Mw/Mn) greater than, or equal to, 2.0, further greater than, or equal to, 2.2, and further greater than, or equal to, 2.5. In a further embodiment, the functionalized ethylene-based polymer is an anhydride and/or carboxylic acid functionalized ethylene-based polymer. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a weight average molecular weight (Mw) greater than, or equal to, 2000 g/mole, further greater than, or equal to, 3000 g/mole, further greater than, or equal to, 4000 g/mole. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a weight average molecular weight (Mw) less than, or equal to, 60000 g/mole, further less than, or equal to, 50000 g/mole, further less than, or equal to, 40000 g/mole. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a melt index (I2), or calculated melt index (I2), greater than, or equal to, 300 g/10 min, further greater than, or equal to, 400 g/10 min, and more further greater than, or equal to, 500 g/10 min. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a melt index (I2), or calculated melt index (I2), less than, or equal to, 1500 g/10 min, further less than, or equal to, 1200 g/10 min, and more further less than, or equal to, 1000 g/10 min. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a percent crystallinity of less than, or equal to, 40 percent, further less than, or equal to, 35 percent, further less than, or equal to, 30 percent, further less than, or equal to, 25 percent, and further less than, or equal to, 20 percent, as determined by DSC. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a percent crystallinity of greater than, or equal to, 2 percent, further greater than, or equal to, 5 percent, and further greater than, or equal to, 10 percent, as determined by DSC. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a density greater than, or equal to, 0.850 g/cc, further greater than, or equal to, 0.855 g/cc, add further greater than, or equal to, 0.860 g/cc. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a density less than, or equal to, 0.900 g/cc, further less than, or equal to, 0.895 g/cc, and further less than, or equal to, 0.890 g/cc. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

In one embodiment, the functionalized ethylene-based polymer has a density from 0.855 g/cm$^3$ to 0.900 g/cm$^3$, further from 0.860 g/cm$^3$ to 0.895 g/cm$^3$, and further from 0.865 g/cm$^3$ to 0.890 g/cm$^3$. In a further embodiment, the anhydride and/or carboxylic acid functionalized ethylene-based polymer is an anhydride and/or carboxylic acid functionalized ethylene/α-olefin interpolymer, and further a copolymer. Preferred alpha-olefins include C3-C8 alpha-olefins, and further propylene, 1-butene, 1-hexene and 1-octene.

A functionalized ethylene-based polymer may comprise a combination of two or more embodiments as described herein.

A functionalized ethylene/α-olefin interpolymer may comprise a combination of two or more embodiments as described herein.

A functionalized ethylene/α-olefin copolymer may comprise a combination of two or more embodiments as described herein.

Ethylene-Based Polymers—Based Polymer for Functionalization

Suitable ethylene-based polymers include, for example, high density polyethylene (HDPE), linear low density polyethylene (LLDPE), ultra low density polyethylene (ULDPE), homogeneously branched linear ethylene polymers, and homogeneously branched substantially linear ethylene polymers (that is homogeneously branched long chain branched ethylene-based polymers).

In a preferred embodiment, the ethylene-based polymer is an ethylene/α-olefin interpolymer, and further an ethylene/α-olefin copolymer.

Suitable α-olefins include, but are not limited to, C3-C20 α-olefins, and further C3-C10 α-olefins. More preferred α-olefins include propylene, 1-butene, 1-pentene, 1-hexene, 1-heptene and 1-octene, and more further include propylene, 1-butene, 1-hexene and 1-octene, and further 1-butene and 1-octene.

In one embodiment, the ethylene-based polymer has a melt viscosity less than, or equal to, 50,000 cP, further less than, or equal to, 40,000 cP, and further less than, or equal to, 30,000 cP, at 350° F. (177° C.). In a further embodiment, the ethylene-based polymer is an ethylene/α-olefin interpolymer, and further an ethylene/α-olefin copolymer. Suitable α-olefins are described above.

In one embodiment, ethylene-based polymer has a melt viscosity greater than, or equal to, 2,000 cP, further greater than, or equal to, 4,000 cP, more further greater than, or equal to, 5,000 cP, at 350° F. (177° C.). In a further embodiment, the ethylene-based polymer is an ethylene/α-olefin interpolymer, and further an ethylene/α-olefin copolymer. Suitable α-olefins are described above.

In one embodiment, the ethylene-based polymer has a melt viscosity from 2,000 cP to 20,000 cP, further from 4,000 cP to 16,000 cP, and further from 5,000 cP to 10,000 cP, at 350° F. (177° C.). In a further embodiment, the ethylene-based polymer is an ethylene/α-olefin interpolymer, and further an ethylene/α-olefin copolymer. Suitable α-olefins are described above.

In one embodiment, the ethylene-based polymer has a molecular weight distribution (Mw/Mn) less than, or equal to, 3.5, and further less than, or equal to, 3.0, and more further less than, or equal to, 2.7. In a further embodiment, the ethylene-based polymer is an ethylene/α-olefin interpolymer, and further an ethylene/α-olefin copolymer. Suitable α-olefins are described above.

In one embodiment, the ethylene-based polymer has a molecular weight distribution from 1.1 to 3.5, and further from 1.1 to 3.0, and more further from 1.1 to 2.7. In a further embodiment, the ethylene-based polymer is an ethylene/α-olefin interpolymer, and further an ethylene/α-olefin copolymer. Suitable α-olefins are described above.

In one embodiment, the ethylene-based polymer has a melt index (I2 or MI), or calculated melt index (I2), greater than, or equal to, 500 g/10 min, further greater than, or equal to, 800 g/10 min, and more further greater than, or equal to, 1000 g/10 min. In a further embodiment, the ethylene-based polymer is an ethylene/α-olefin interpolymer, and further an ethylene/α-olefin copolymer. Suitable α-olefins are described above.

In one embodiment, the ethylene-based polymer has a melt index (I2 or MI), or calculated melt index (I2), less than, or equal to, 2000 g/10 min, further less than, or equal to, 1800 g/10 min, and more further less than, or equal to, 1600 g/10 min. In a further embodiment, the ethylene-based polymer is an ethylene/α-olefin interpolymer, and further an ethylene/α-olefin copolymer. Suitable α-olefins are described above.

In one embodiment, the ethylene-based polymer has a percent crystallinity of less than, or equal to, 40 percent, further less than, or equal to, 30 percent, and more further less than, or equal to, 20 percent, as determined by DSC. In a further embodiment, the ethylene-based polymer is an ethylene/α-olefin interpolymer, and further an ethylene/α-olefin copolymer. Suitable α-olefins are described above.

In one embodiment, the ethylene-based polymer has a percent crystallinity of greater than, or equal to, 2 percent, further greater than, or equal to, 5 percent, and more further greater than, or equal to, 10 percent, as determined by DSC. In a further embodiment, the ethylene-based polymer is an ethylene/α-olefin interpolymer, and further an ethylene/α-olefin copolymer. Suitable α-olefins are described above.

In one embodiment, the ethylene-based polymer has a percent crystallinity from 2 to 30 percent, further from 5 to 25 percent, and more further from 10 to 20 percent, as determined by DSC. In a further embodiment, the ethylene-based polymer is an ethylene/α-olefin interpolymer, and further an ethylene/α-olefin copolymer. Suitable α-olefins are described above.

In one embodiment, the ethylene-based polymer has a percent crystallinity from 10 to 27 percent, further from 15 to 25 percent, and more further from 18 to 23 percent, as determined by DSC. In a further embodiment, the ethylene-based polymer is an ethylene/α-olefin interpolymer, and further an ethylene/α-olefin copolymer. Suitable α-olefins are described above.

In one embodiment, the ethylene-based polymer has a density greater than, or equal to, 0.855 g/cc, further greater than, or equal to, 0.860 g/cc, more further greater than, or equal to, 0.865 g/cc (1 cc=1 cm$^3$). In a further embodiment, the ethylene-based polymer is an ethylene/α-olefin interpolymer, and further an ethylene/α-olefin copolymer. Suitable α-olefins are described above.

In one embodiment, the ethylene-based polymer has a density less than, or equal to, 0.900 g/cc, further less than, or equal to, 0.895 g/cc, more further less than, or equal to, 0.890 g/cc. In a further embodiment, the ethylene-based polymer is an ethylene/α-olefin interpolymer, and further an ethylene/α-olefin copolymer. Suitable α-olefins are described above.

In one embodiment, the ethylene-based polymer has a density from 0.855 g/cc to 0.900 g/cc, and further from 0.860 g/cc to 0.895 g/cc, and more further from 0.865 g/cc to 0.890 g/cc. In a further embodiment, the ethylene-based polymer is an ethylene/α-olefin interpolymer, and further an ethylene/α-olefin copolymer. Suitable α-olefins are described above.

In one embodiment, the ethylene-based polymer has a density from 0.870 g/cc to 0.885 g/cc, and further from 0.872 g/cc to 0.882 g/cc, and more further from 0.875 g/cc to 0.880 g/cc. In a further embodiment, the ethylene-based polymer is an ethylene/α-olefin interpolymer, and further an ethylene/α-olefin copolymer. Suitable α-olefins are described above.

Some examples of ethylene/α-olefin copolymers include suitable AFFINITY GA Polyolefin Plastomers, available from The Dow Chemical Company, and suitable LICOCENE Performance Polymers from Clariant. Other examples of ethylene/α-olefin polymers suitable for the invention include the ultra low molecular weight ethylene polymers described in U.S. Pat. Nos. 6,335,410, 6,054,544 and 6,723,810, each fully incorporated herein by reference.

In one embodiment, the ethylene-based polymer is a homogeneously branched linear ethylene/α-olefin interpolymer, and further a copolymer, or a homogeneous branched substantially linear ethylene/α-olefin interpolymer, and further a copolymer. Suitable α-olefins are described above.

In one embodiment, the ethylene-based polymer is a homogeneously branched linear ethylene/α-olefin interpolymer, and further a copolymer. Suitable α-olefins are described above.

In one embodiment, the ethylene-based polymer is a homogeneous branched substantially linear ethylene/α-olefin interpolymer, and further a copolymer. Suitable α-olefins are described above.

The terms "homogeneous" and "homogeneously-branched" are used in reference to an ethylene/α-olefin interpolymer, in which the α-olefin comonomer is randomly distributed within a given polymer molecule, and all of the polymer molecules have the same or substantially the same comonomer-to-ethylene ratio.

The homogeneously branched linear ethylene interpolymers are ethylene polymers, which lack long chain branching, but do have short chain branches, derived from the comonomer polymerized into the interpolymer, and which are homogeneously distributed, both within the same polymer chain, and between different polymer chains. These ethylene/α-olefin interpolymers have a linear polymer backbone, no measurable long chain branching, and a narrow molecular weight distribution. This class of polymers is disclosed, for example, by Elston in U.S. Pat. No. 3,645,992, and subsequent processes to produce such polymers, using bis-metallocene catalysts, have been developed, as shown, for example, in EP 0 129 368; EP 0 260 999; U.S. Pat. No. 4,701,432; U.S. Pat. No. 4,937,301; U.S. Pat. No. 4,935,397; U.S. Pat. No. 5,055,438; and WO 90/07526; each incorporated herein by reference. As discussed, the homogeneously branched linear ethylene interpolymers lack long chain branching, just as is the case for the linear low density polyethylene polymers or linear high density polyethylene polymers. Commercial examples of homogeneously branched linear ethylene/α-olefin copolymers include TAFMER polymers from the Mitsui Chemical Company, and EXACT and EXCEED polymers from ExxonMobil Chemical Company.

The homogeneously branched substantially linear ethylene/α-olefin interpolymers are described in U.S. Pat. Nos. 5,272,236; 5,278,272; 6,054,544; 6,335,410 and 6,723,810; each incorporated herein by reference. The substantially linear ethylene/α-olefin interpolymers and copolymers have long chain branching. The long chain branches have the same comonomer distribution as the polymer backbone, and can have about the same length as the length of the polymer backbone. "Substantially linear," typically, is in reference to a polymer that is substituted, on average, with "0.01 long chain branches per 1000 carbons" to "3 long chain branches per 1000 carbons." The length of a long chain branch is longer than the carbon length of a short chain branch, formed from the incorporation of one comonomer into the polymer backbone.

Some polymers may be substituted with 0.01 long chain branches per 1000 total carbons to 3 long chain branch per 1000 total carbons, further from 0.01 long chain branches per 1000 total carbons to 2 long chain branch per 1000 total carbons, and further from 0.01 long chain branches per 1000 total carbons to 1 long chain branch per 1000 total carbons.

The substantially linear ethylene/α-olefin interpolymers and copolymers form a unique class of homogeneously branched ethylene polymers. They differ substantially from the well-known class of conventional, homogeneously branched linear ethylene/α-olefin interpolymers, as discussed above, and, moreover, they are not in the same class as conventional heterogeneous "Ziegler-Natta catalyst polymerized" linear ethylene polymers (for example, ultra low density polyethylene (ULDPE), linear low density polyethylene (LLDPE) or high density polyethylene (HDPE), made, for example, using the technique disclosed by Anderson et al., in U.S. Pat. No. 4,076,698); nor are they in the same class as high pressure, free-radical initiated, highly branched polyethylenes, such as, for example, low density polyethylene (LDPE), ethylene-acrylic acid (EAA) copolymers and ethylene vinyl acetate (EVA) copolymers.

The homogeneously branched, substantially linear ethylene/α-olefin interpolymers and copolymers useful in the invention have excellent processability, even though they have a relatively narrow molecular weight distribution. Surprisingly, the melt flow ratio (I10/I2), according to ASTM D 1238, of the substantially linear ethylene interpolymers can be varied widely, and essentially independently of the molecular weight distribution (Mw/Mn or MWD). This surprising behavior is contrary to conventional homogeneously branched linear ethylene interpolymers, such as those described, for example, by Elston in U.S. Pat. No. 3,645,992, and heterogeneously branched, conventional "Ziegler-Natta polymerized," linear polyethylene interpolymers, such as those described, for example, by Anderson et al., in U.S. Pat. No. 4,076,698. Unlike substantially linear ethylene interpolymers, linear ethylene interpolymers (whether homogeneously or heterogeneously branched) have rheological properties, such that, as the molecular weight distribution increases, the 110/12 value also increases.

Long chain branching can be determined by using 13C Nuclear Magnetic Resonance (NMR) spectroscopy, and can be quantified using the method of Randall (Rev. Macromol. Chem. Phys., C29 (2 &3), 1989, p. 285-297), the disclosure of which is incorporated herein by reference. Two other methods are Gel Permeation Chromatography, couple with a Low Angle Laser Light Scattering detector (GPCLALLS), and Gel Permeation Chromatography, coupled with a Differential Viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949), and Rudin, A., Modern Methods of Polymer Characterization, John Wiley & Sons, New York (1991) pp. 103-112.

In contrast to "substantially linear ethylene interpolymer or copolymer," "linear ethylene interpolymer or copolymer" means that the polymer lacks measurable or demonstrable long chain branches, that is, the polymer is substituted with an average of less than 0.01 long chain branch per 1000 carbons.

An ethylene-based polymer may comprise a combination of two or more embodiments as described herein.

An ethylene/α-olefin interpolymer may comprise a combination of two or more embodiments as described herein.

An ethylene/α-olefin copolymer may comprise a combination of two or more embodiments as described herein.

Additives

An inventive composition may comprise one or more additives. Additives include, but are not limited to, stabilizers, pigments, nucleating agents, fillers, slip agents, fire retardants, and plasticizers.

Typically polymers and polymer compositions used in the invention are treated with one or more stabilizers, for example, antioxidants, such as IRGANOX 1010 and IRGAFOS 168, both now supplied by BASF. Polymers are typically treated with one or more stabilizers before an extrusion or other melt processes.

In one embodiment, the composition further comprises an olefin-based polymer. In a further embodiment, the olefin-based polymer is selected from polyethylene homopolymer, a ethylene-based interpolymer, a polypropylene homopolymer, a propylene-based interpolymer, or hydrogenated homopolymers or copolymers of butadiene or other materials with two vinyl groups per monomer.

In another embodiment, the composition further comprising a polar polymer. In a further embodiment, the polar polymer is selected from polyesters, polyamides, polyethers, polyetherimides, polyvinylalcohols, polylactic acids, polyurethanes, polycarbonatates, polyamide esters, or polyvinylchlorides. In a further embodiment, the functionalized ethylene-based polymer is dispersed in the polar polymer to form particles thereof.

The inventive compositions may comprise a combination of two or more embodiments as described herein.

In one embodiment, the functionalized ethylene-based polymer is further reacted with a primary-secondary diamine and/or an alkanolamine. Primary-secondary diamines include, but are not limited to, N-ethylethylenediamine, N-phenylethylenediamine, N-phenyl-1,2-phenylene-diamine, N-phenyl-1,4-phenylenediamine, and N-(2-hydroxyethyl)-ethylenediamine. Alkanolamines include, but are not limited to, 2-aminoethanol, 2-amino-1-propanol, 3-amino-1-propanol, 2-amino-1-butanol, 2-(2-aminoethoxy)-ethanol and 2-aminobenzyl alcohol.

Applications

The invention also provides an article comprising at least one component formed from an inventive composition.

In one embodiment, the article is selected from a film, a fiber, a foam, a molded part, a coating, an adhesive, or a dispersion.

In one embodiment, the article is selected from an automotive part, an adhesive, a computer part, a roofing material, a construction material, a carpet component, or a footwear component.

In one embodiment, the article is a carpet, an adhesive, a wire sheath, a cable, a coating, a fiber, or a foam. In another embodiment, the article is a tie layer between extruded sheets, films or profiles; a tie layer between cast sheets, films or profiles; an automotive skin; an awning; a tarp; a roofing construction article; a steering wheel; a powder coating; a powder slush molding; a consumer durable; a computer component; a belt; or a footwear component.

The functionalized ethylene-based polymer compositions can be used in various applications, including, but not limited to, adhesives to polymer substrates and foams, for example adhesives to polyurethane films and foams, and adhesives to polyesters; dyes, paint adhesives and paint adhesion enablers; weldability applications; automotive interiors and exteriors; lubricants and engine oil components; fibers; fabrics; paper or corrugated paper packaging, compatibilizers for polymer compositions; toughening agents for polymer compositions; conveyor belts; films; adhesives; footwear components; artificial leather; injection molded objects, such as injection molded toys; roofing and construction materials; dispersions; carpet components, such as carpet backings; and artificial turf. Further applications include adhesives, tie-layers for multi-layer films, and blends with other polar polymer for impact modification.

Definitions

Unless stated to the contrary, all test methods are current as of the filing date of this disclosure.

The term "thermally treating," as used herein, refers to the application of heat to a material or composition. Heat may be applied using, for example, heat conduction through different forms of electrical heating devices, through oil or water jacketed barrels, or through viscous dissipation in a mechanical mixer.

The term "composition," as used herein, includes a mixture of materials which comprise the composition, as well as reaction products and decomposition products formed from the materials of the composition.

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities, for example, catalyst residues, may be incorporated into and/or within the polymer.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term, "olefin-based polymer," as used herein, refers to a polymer that comprises, in polymerized form, a majority amount of olefin monomer, for example ethylene or propylene (based on the weight of the polymer), and optionally may comprise one or more comonomers.

The term, "ethylene-based polymer," as used herein, refers to a polymer that comprises, in polymerized form, a majority amount of ethylene monomer (based on the weight of the polymer), and optionally may comprise one or more comonomers.

The term, "ethylene/α-olefin interpolymer," as used herein, refers to an interpolymer that comprises, in polymerized form, a majority amount of ethylene monomer (based on the weight of the interpolymer), and at least one α-olefin.

The term, "ethylene/α-olefin copolymer," as used herein, refers to a copolymer that comprises, in polymerized form, a majority amount of ethylene monomer (based on the weight of the copolymer), and an α-olefin, as the only two monomer types.

The term "bond dissociation energy" (BDE) as used herein, refers to the strength of a chemical bond. It is defined as the standard enthalpy change when a bond is cleaved by homolysis, with reactants and products of the homolysis reaction at 298 K. See Blanksby S. J. and Ellison G. B., Acc. Chem. Res. 2003, 36, 255-263. The hydrogen BDE, reflects the stability and the reactivity of the radical coproduced with the hydrogen atom.

The term "primary radical," as used herein, refers to a radical formed from the initial decomposition of a peroxide, and before any secondary reactions such as beta scission, decarboxylation, etc., occur.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Half Life

Half life values are obtained by measuring decomposition of dilute peroxide solutions in solvents. The half life can be calculated from the Arrhenius equation as follows: $k_d = A \cdot e^{-Ea/RT}$, where A is the Arrhenius frequency factor, $E_a$ is the activation energy, T is the test temperature, and R is the ideal gas constant. For example, see Table A below. The half life ($t_{1/2}$) is calculated from the following equation: $t_{1/2} = \ln 2/k_d$. The value for "A" and the value for "Ea" can each be determined from literature (for example, literature from Arkema).

The data for this work was obtained from the Arkema literature "Arkema Peroxide Half-Life Calculator," 2005 Arkema, Inc., available through "www.arkema-inc.com/pdf/HalfLife.xls," which used 0.2M peroxide in dodecane (solvent).

TABLE A

| # of Half Lives | 1 | 2 | 3 | 4 | 5 | 6 |
|---|---|---|---|---|---|---|
| % POX decomposed | 50 | 75 | 87.5 | 93.75 | 96.9 | 98.4 |

SADT (Self Accelerated Decomposition Temperature)

The SADT value for a peroxide can be determined as follows. The package containing the peroxide is placed in oven equilibrated at the test temperature. The time is noted, when packaged peroxide reaches 2° C. below intended test temperature. The oven is held at constant test temperature for up to one week, or, until a runaway event occurs.

The peroxide "passes," if the packaged peroxide does not exceed test (oven) temperature by 6° C. within one week. The peroxide "fails," if the packaged peroxide exceeds test temperature by 6° C. within one week.

The test is repeated in 5° C. increments of increased test temperature, until a failure is reached. The failure temperature is reported as the SADT for the peroxide. The SADT is dependent on three major factors: 1) structure of the peroxide; 2) dilution of the peroxide with mineral spirits, mineral oil or other diluents; 3) package size. Preferably, pure peroxide (>90 wt % peroxide) is tested. Generally SADT is determined for the largest package size. The largest package is determined by UN transport classification and regulations. See, for example, Sanchez et al., "Peroxides and Compounds (Organic)," Encyclopedia of Chemical Technology, Volume 18, 1996. The TRIGONOX 117 AND TRIGINOX 101 are each classified as UN 3105, and the SADT is measured on a 110 lb package. The TRIGONOX 29 is classified as UN 3101, and SADT is measured on a 55 lb package. See also, the product brochure from AkzoNobel, "Initiators and Reactor Additives for Thermoplastics," 2010.

Melt Viscosity

Melt viscosity is measured in accordance with ASTM D 3236 (177° C., 350° F.), using a Brookfield Digital Viscometer (Model DV-III, version 3), and disposable aluminum sample chambers. The spindle used, in general, is a SC-31 hot-melt spindle, suitable for measuring viscosities in the range from 10 to 100,000 centipoise. The sample is poured into the chamber, which is, in turn, inserted into a Brookfield Thermoset, and locked into place. The sample chamber has a notch on the bottom that fits the bottom of the Brookfield Thermosel, to ensure that the chamber is not allowed to turn, when the spindle is inserted and spinning. The sample (approximately 8-10 grams of resin) is heated to the required temperature, until the melted sample is about one inch below the top of the sample chamber. The viscometer apparatus is lowered, and the spindle submerged into the sample chamber. Lowering is continued, until the brackets on the viscometer align on the Thermoset. The viscometer is turned on, and set to operate at a shear rate which leads to a torque reading in the range of 40 to 60 percent of the total torque capacity, based on the rpm output of the viscometer. Readings are taken every minute for about 15 minutes, or until the values stabilize, at which point, a final reading is recorded.

Melt Index

Melt index (I2, or MI) of an ethylene-based polymer is measured in accordance with ASTM D-1238, condition 190° C./2.16 kg. For high I2 polymers (I2 greater than, or equal to, 200 g/mole, melt index is preferably calculated from Brookfield viscosity as described in U.S. Pat. Nos. 6,335, 410; 6,054,544; 6,723,810. I2(190° C./2.16 kg)= $3.6126[10^{(log(\eta)-6.6928)/-1.1363}]-9.3185$, where $\eta$=melt viscosity, in cP, at 350° F.

Gel Permeation Chromatography

The average molecular weights and molecular weight distributions for ethylene-base polymers are determined with a chromatographic system, consisting of either a Polymer Laboratories Model PL-210 or a Polymer Laboratories Model PL-220. The column and carousel compartments are operated at 140° C. for ethylene-based polymers. The columns are three Polymer Laboratories 10-micron, Mixed-B columns. The solvent is 1,2,4-tri-chlorobenzene. The samples are prepared at a concentration of "0.1 gram of polymer" in "50 milliliters" of solvent. The solvent used to prepare the samples contains "200 ppm of butylated hydroxytoluene (BHT)." Samples are prepared by agitating lightly for two hours at 160° C. The injection volume is "100 microliters," and the flow rate is 1.0 milliliters/minute. Calibration of the GPC column set is performed with narrow molecular weight distribution polystyrene standards, purchased from Polymer Laboratories (UK). The polystyrene standard peak molecular weights are converted to polyethylene molecular weights using the following equation (as described in Williams and Ward, J. Polym. Sci., Polym. Let., 6, 621 (1968)):

$$M_{polyethylene}=A \times (M_{polystyrene})^B,$$

where M is the molecular weight, A has a value of 0.4315 and B is equal to 1.0.

Polyethylene equivalent molecular weight calculations are performed using VISCOTEK TriSEC software Version 3.0. The molecular weights for polypropylene-based polymers can be determined using Mark-Houwink ratios according to ASTM D6474.9714-1, where, for polystyrene a=0.702 and log K=−3.9, and for polypropylene, a=0.725 and log K=−3.721. For polypropylene-based samples, the column and carousel compartments are operated at 160° C.

Differential Scanning Calorimetry

Differential Scanning calorimetry (DSC) is used to measure crystallinity in polyethylene (PE) based samples and polypropylene (PP) based samples. About five to eight milligrams of sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (e.g., for PE, % cryst.=($H_f$/292 J/g)×100; and for PP, % cryst.=($H_f$/165 J/g)×100).

Unless otherwise stated, melting point(s) ($T_m$) of each polymer is determined from the second heat curve obtained from DSC, as described above. The crystallization temperature ($T_c$) is measured from the first cooling curve.

Density

Samples for density measurement are prepared according to ASTM D 1928. Polymer samples are pressed at 190° C. and 30,000 psi (207 MPa) for three minutes, and then at 21° C. and 30,000 psi (207 MPa) for one minute. Measurements are made within one hour of sample pressing using ASTM D792, Method B.

Fourier Transform Infrared Spectroscopy (FTIR) Analysis—Maleic Anhydride Content.

The concentration of maleic anhydride is determined by the ratio of peak heights of the maleic anhydride at wave number 1791 $cm^{-1}$ to the polymer reference peak, which, in case of polyethylene, is at wave number 2019 $cm^{-1}$. Maleic anhydride content is calculated by multiplying this ratio with the appropriate calibration constant. The equation used for maleic grafted polyolefins (with reference peak for polyethylene) has the following form, as shown in Equation 1.

MAH (wt %)=$A$*{[FTIR PeakArea@1791 cm-1]/[FTIR PeakArea 2019 cm-1]+B*[FTIR PeakArea@1712 cm-1]/[FTIR_PeakArea@2019 cm-1]} (Eqn. 1)

The calibration constant A can be determined using C13 NMR standards. The actual calibration constant may differ slightly, depending on the instrument and polymer. The second component at wave number 1712 $cm^{-1}$ accounts for the presence of maleic acid, which is negligible for freshly grafted material. Over time, however, maleic anhydride is readily converted to maleic acid in the presence of moisture. Depending on surface area, significant hydrolysis can occur in just a few days under ambient conditions. The acid has a distinct peak at wave number 1712 $cm^{-1}$. The constant B in Equation 1 is a correction for the difference in extinction coefficients between the anhydride and acid groups.

The sample preparation procedure begins by making a pressing, typically 0.05 to 0.15 millimeters in thickness, in a heated press, between two protective films, at 150-180° C. for one hour. MYLAR and TEFLON are suitable protective films to protect the sample from the platens. Aluminum foil must never be used (maleic anhydride reacts with aluminum). Platens should be under pressure (~10 ton) for about five minutes. The sample is allowed to cool to room temperature, placed in an appropriate sample holder, and then scanned in the FTIR. A background scan should be run before each sample scan, or as needed. The precision of the test is good, with an inherent variability of less than ±5%. Samples should be stored with desiccant to prevent excessive hydrolysis. Moisture content in the product has been measured as high as 0.1 weight percent. The conversion of anhydride to acid however is reversible with temperature, but may take up to one week for complete conversion. The reversion is best performed in a vacuum oven at 150° C.; a good vacuum (near 30 inches Hg) is required. If the vacuum is less than adequate, the sample tends to oxidize resulting in an infrared peak at approximately 1740 cm$^{-1}$, which will cause the values for the graft level to be too low. Maleic anhydride and acid are represented by peaks at about 1791 and 1712 cm$^{-1}$, respectively.

The polymers, compositions and processes of this invention, and their use, are more fully described by the following examples. The following examples are provided for the purpose of illustrating the invention, and are not to be construed as limiting the scope of the invention.

Experimental

The materials used in this study and their properties are shown in Tables 1A and 1B.

TABLE 1A

Reagents

| Material | Chemical Name | CAS No. | Supplier |
|---|---|---|---|
| AFFINITY GA 1875* | Ethylene octene copolymer | 26221-73-8 | Dow Chemical |
| Maleic anhydride | Maleic anhydride | 108-31-6 | |
| Methyl ethyl ketone | 2-butanone | 78-93-3 | Sigma Aldrich |
| TRIGONOX 101 | 2,5 dimethyl 2,5-di(t-butylperoxy) hexane | 78-63-7 | Sigma Aldrich |
| TRIGONOX 29 | 1,1-di(tert-butylperoxy)-3,3,5-trimethylcyclohexane | 6731-36-8 | AkzoNobel |
| TRIGONOX 117 | Tert-butylperoxy 2-ethylhexyl carbonate | 34443-12-4 | AkzoNobel |

*Density from 0.868 to 0.873 g/cc, and melt viscosity from 5700 to 7700 cP (177° C. (350° F.)).

TABLE 1B

Additional properties of the peroxides investigated

| | TRIGONOX 101 | TRIGONOX 29 | TRIGONOX 117 |
|---|---|---|---|
| Active Oxygen (%) | 11.02 | 10.58 | 6.49 |
| SADT (° C.) of pure peroxide | 86 | 60 | 60 |
| Mol Wt (g/mol) | 290 | 302 | 246 |
| Primary radical(s) | t-butoxy, alkoxy | t-butoxy | t-butoxy, alkoxy-carbonyloxy |
| Primary radical Type | RO• | RO• | RO•, ROC(O)O• |
| Dissociation Energies of primary radicals (kcal/mole)* | ≥100 | ≥100 | ≥100 |

*Blanksby S. J. and Ellison G. B., Acc. Chem. Res. 2003, 36, 255-263.

Table 1C below shows the half lives of the three peroxides at different temperatures. As a rule of thumb, about 5-6 half lives are required for greater than 99% decomposition of the peroxide into radicals, to initiate grafting. In a typical reactive extrusion process, it is desirable to have the residence time of the order of less than one minute, to avoid unreasonably low productivity rates. Therefore, it is desirable to have a half-life of about 10 seconds, at the melt temperature at which grafting is carried out. In this case the melt temperatures are 170° C.-190° C.

TABLE 1C

Half Life versus Temperature for the various peroxides

| (Deg C.) | TRIGONOX 101$^a$ (minutes) | TRIGONOX 29$^b$ (minutes) | TRIGONOX 117$^c$ (minutes) |
|---|---|---|---|
| 160 | 7.65 | 0.50 | 1.59 |
| 170 | 2.89 | 0.20 | 0.70 |
| 180 | 1.14 | 0.08 | 0.32 |
| 190 | 0.47 | 0.03 | 0.15 |
| 200 | 0.20 | 0.02 | 0.07 |
| 210 | 0.09 | 0.01 | 0.04 |
| 220 | 0.04 | 0.003 | 0.02 |

$^a$E$_a$ = 155.6 kJ/mol, and A = 8.73E+15 sec$^{-1}$.
$^b$E$_a$ = 148.5 kJ/mol, and A = 1.90E+16 sec$^{-1}$.
$^c$E$_a$ = 131.8 kJ/mol, and A = 5.64E+13 sec$^{-1}$.

As seen in Table 1B, "lower half life" peroxides also typically have lower SADT (Self Accelerated Decomposition Temperatures) values. If the SADT decreases to values close to room temperature, special storage and transportation requirements are warranted, to avoid safety hazards associated with low SADT values. Thus the choice of the peroxide is not only determined by the half life, but also by safe handling requirements.

Grafting Reaction

The grafting experiments were completed on a Coperion 25 mm, twin-screw reactive extrusion line with a 48 L/D. There were 12 barrels and 9 temperature zones. Maleic anhydride was dissolved in methyl ethyl ketone (MEK) solvent, at 50 wt % maleic anhydride, based on the weight of the solution. The maleic anhydride was added to the MEK in a flask, and stirred overnight with a magnetic stirrer bar. A mixture of the MEK solvent, maleic anhydride, and peroxide, was injected in the barrel #4 (zone #3) of the extruder. The liquid pump system was an ISCO D1000 positive displacement pump. Unreacted peroxide and volatile compounds were removed via a "knock-out pot" at the devo port in barrel #10 (zone #8). A Sterling liquid ring vacuum pump (model LEMC 60) provided "20 in Hg" negative pressure to assist in removing the volatiles.

Polymer pellets were metered into the extruder throat using a K-tron model KCLKT20 twin-screw, loss-in-weight feeder. The feed rate was varied from 12.5 to 37.5 lb/h, at a fixed 500 rpm screw speed. Tables 2A-2D show the typical conditions that were used during this trial run.

Measurement of Minimum Residence Time

The residence time in an extruder was measured by using a pulse method to introduce a color marker at time zero, and by observing the response (color change) at the discharge of the extruder, as a function of time. The minimum residence time in the extruder was measured as the time between the introduction of a tracer particle, and the time when color was first observed at the die exit.

A color concentrate additive, with the same base resin as the system (composition) of interest, was chosen. In the present study, a dark red, polyethylene color concentrate from AMPACET was chosen. The base resin insures that the pigments in the color concentrate will be compatible with the resin system in the extruder.

The extrusion system was started at the standard operating conditions desired for the measurement. The process was run for several minutes, until the system reached steady state operation. For a twin-screw extruder, 3-5 color concentrate pellets were dropped into the feed port of the extruder. A stop watch was started, as soon as the color concentrate pellets were introduced into the system. This was the start time for the measurement. The strand of material exiting the die was observed. The stop watch was stopped, as soon as the first perceptible level of color was present at the die exit. This time represented the minimum residence time through the extruder system. Three measurements were made, and the average recorded.

Calculation of Average Residence Time

The average residence time was calculated using a commercial "AKRO-CO-TWIN SCREW, Version 3" software. The calculation of the average residence time using the AKRO-CO software is discussed in a paper by S. Bawiskar & J. L. White, "A Composite Model for Solid Conveying, Melting, Pressure and Fill Factor Profiles in Modular Co-rotating Twin Screw Extruders," *International Polymer Processing*, Vol XII (4), 1997, pp. 331-340.

The average residence time of the process=total filled volume of the extrusion/total volumetric flow rate of polymer. The calculation of the volume of the extruder can be determined using the process described in the article by Booy M. L., "Geometry of Fully Wiped Twin Screw Equipment," *Polymer Engineering and Science*, Volume 18, Issue 12, pages 973-984, September 1978. The filled volume is calculated based on the flow characteristics of the individual screw elements in the screw design. The volumetric flow rate is based on the feed rate and the melt density. Process results are shown below in Tables 2A-2D.

TABLE 2A

Experimental Results with TRIGONOX 101 at Higher Barrel Temperatures

| Example | 1-1 | 1-10 | 1-11 | Comp. 1-2 | Comp. 1-3 |
|---|---|---|---|---|---|
| Rate [lb/h] | 12.5 | 12.5 | 12.5 | 25 | 37.5 |
| Screw Speed, rpm | 500 | 500 | 500 | 500 | 500 |
| Barrel Temp, Zone 1-2, ° C. | 60 | 60 | 60 | 60 | 60 |
| Barrel Temp, Zone 3-10, ° C. | 195 | 195 | 195 | 195 | 195 |
| AFFINITY GA 1875* | 96.25 | 96.25 | 96.25 | 96.25 | 96.25 |
| Maleic Anhydride* | 1.8 | 1.8 | 1.8 | 1.8 | 1.8 |
| MEK* | 1.8 | 1.8 | 1.8 | 1.8 | 1.8 |
| TRIGONOX 101* | 0.15 | 0.15 | 0.15 | 0.15 | 0.15 |
| TRIGONOX 29* | 0 | 0 | 0 | 0 | 0 |
| TRIGONOX 117* | 0 | 0 | 0 | 0 | 0 |
| MAH Graft Content [wt %]** | 0.49 | 0.50 | 0.61 | 0.31 | 0.19 |
| Viscosity, 177° C. [cP] | 9878 | 11438 | 11078 | 8813 | 8368 |
| Peroxide Type | TRIGONOX 101 | TRIGONOX 101 | TRIGONOX 101 | TRIGONOX 101 | TRIGONOX 101 |
| Residual peroxide [ug/g]*** | 78.8 | 74.8 | 102.2 | 240.4 | 364.1 |
| Minimum Residence Time (s) Average ± SD (n = 3) | 79 ± 2 | 79 ± 2 | 79 ± 2 | 44 ± 1 | 31 ± 1 |
| Calculated Average Residence Time, s | 86 | 86 | 86 | 48 | 34 |
| Exit Melt Temperature (° C.) | 188 | 191 | 191 | 190 | 190 |
| Maximum Barrel Temperature (° C.) | 195 | 195 | 195 | 195 | 195 |
| Peroxide Half Life @ max Barrel Temp, s | 18 | 18 | 18 | 18 | 18 |

*Amount in parts by weight.
**Weight percent based on weight of functionalized ethylene-based polymer.
***Microgram residual peroxide per gram of functionalized ethylene-based polymer.

TABLE 2B

Experimental Results with Alternate Peroxides at Higher Barrel Temperatures

| Examples | 1-4 | 1-5 | 1-6 | 1-7 | 1-8 | 1-9 |
|---|---|---|---|---|---|---|
| Rate [lb/h] | 12.5 | 25 | 37.5 | 12.5 | 25 | 37.5 |
| Screw Speed, rpm | 500 | 500 | 500 | 500 | 500 | 500 |
| Barrel Temp, Zone 1-2, ° C. | 60 | 60 | 60 | 60 | 60 | 60 |
| Barrel Temp, Zone 3-10, ° C. | 195 | 195 | 195 | 195 | 195 | 195 |

TABLE 2B-continued

Experimental Results with Alternate Peroxides at Higher Barrel Temperatures

| Examples | 1-4 | 1-5 | 1-6 | 1-7 | 1-8 | 1-9 |
|---|---|---|---|---|---|---|
| AFFINITY GA 1875* | 96.25 | 96.25 | 96.25 | 96.25 | 96.25 | 96.25 |
| Maleic Anhydride* | 1.8 | 1.8 | 1.8 | 1.8 | 1.8 | 1.8 |
| MEK* | 1.8 | 1.8 | 1.8 | 1.8 | 1.8 | 1.8 |
| TRIGONOX 101* | 0 | 0 | 0 | 0 | 0 | 0 |
| TRIGONOX 29* | 0.15 | 0.15 | 0.15 | 0 | 0 | 0 |
| TRIGONOX 117* | 0 | 0 | 0 | 0.15 | 0.15 | 0.15 |
| MAH Graft Content [wt %]** | 0.15 | 0.15 | 0.16 | 0.54 | 0.45 | 0.36 |
| Viscosity (177° C.) [cP] | 6418 | 6508 | 6287 | 10602 | 9696 | 8773 |
| Peroxide Type | TRIGONOX 29 | TRIGONOX 29 | TRIGONOX 29 | TRIGONOX 117 | TRIGONOX 117 | TRIGONOX 117 |
| Residual peroxide [ug/g]*** | | | | 68.8 | 39.6 | 72.4 |
| Minimum Residence Time (s) Average ± SD (n = 3) | 79 ± 2 | 44 ± 1 | 31 ± 1 | 79 ± 2 | 44 ± 1 | 31 ± 1 |
| Calculated Average Residence Time (s) | 86 | 48 | 34 | 86 | 48 | 34 |
| Exit Melt Temperature (° C.) | 190 | 191 | 192 | 191 | 193 | 192 |
| Maximum Barrel Temperature (° C.) | 195 | 195 | 195 | 195 | 195 | 195 |
| Peroxide Half Life @ max Barrel Temp, s | 1 | 1 | 1 | 6 | 6 | 6 |

*Amounts in parts by weight.
**Weight percent based on weight of functionalized ethylene-based polymer.
***Microgram residual peroxide per gram of functionalized ethylene-based polymer.

The results of the first set of maleic anhydride grafting experiments are shown in Table 2A, Table 2B, and FIG. 1. TRIGONOX 101 was used in the examples of Table 2A. In Table 2B, the examples (1-4 through 1-9) were each prepared with alternative peroxide, TRIGONOX 29 or TRIGONOX 117.

As seen in Table 2A, at the same "maximum barrel temperature," the MAH graft content decreased for comparative examples 1-2 and 1-3, and the residual peroxide level increased. As seen in Table 2B, the maleic anhydride did graft in all examples 1-4 to 1-9, however, even higher levels of maleic anhydride graft was achieved in those examples (1-7 to 1-9) that use the "lower temperature" peroxide, TRIGONOX 117.

The experiments demonstrate that at equivalent mass flow rate, not all peroxides with shorter half lives are effective at grafting the maleic anhydride monomer onto the polymer backbone. At equivalent mass flow rate, the alternative peroxide TRIGONOX 117 had a higher reaction efficiency to graft maleic anhydride onto the base polymer, as compared to the compositions containing the other peroxides.

One of the "shorter half-life peroxides," TRIGONOX 29, displayed lower grafting levels over the flow rate range of the study, as compared to TRIGONOX 117. This suggests that an increase in grafting levels requires both a shorter half life, and a radical of sufficient energy to abstract a hydrogen from the polymer chain, to create a radical on the polymer, which will graft onto the vinyl group of the maleic anhydride monomer.

TABLE 2C

Experimental Results with TRIGONOX 101 at Lower Barrel Temperatures

| Examples | Comp 2-1 | Comp 2-2 | Comp 2-3 |
|---|---|---|---|
| Rate [lb/h] | 12.5 | 25 | 37.5 |
| Screw Speed, rpm | 500 | 500 | 500 |
| Barrel Temp, Zone 1, ° C. | 60 | 60 | 60 |
| Barrel Temp, Zone 2-7, ° C. | 180 | 180 | 180 |
| Barrel Temp, Zone 9-10, ° C. | 130 | 130 | 130 |
| AFFINITY GA 1875* | 96.25 | 96.25 | 96.25 |
| Maleic Anhydride* | 1.8 | 1.8 | 1.8 |
| MEK* | 1.8 | 1.8 | 1.8 |
| TRIGONOX 101* | 0.15 | 0.15 | 0.15 |
| TRIGONOX 117* | 0 | 0 | 0 |
| Mineral oil* | 0 | 0 | 0 |
| MAH Graft Content [wt %]** | 0.19 | 0.10 | 0.08 |
| Viscosity (177° C.) [cP] | 8256 | 7753 | 8008 |
| Peroxide Type | TRIGONOX 101 | TRIGONOX 101 | TRIGONOX 101 |

TABLE 2C-continued

Experimental Results with TRIGONOX 101 at Lower Barrel Temperatures

| Examples | Comp 2-1 | Comp 2-2 | Comp 2-3 |
|---|---|---|---|
| Residual peroxide [ug/g]*** | 704 | 1140 | 1065 |
| Minimum Residence Time (s) Average ± SD; (n = 3) | 79 ± 2 | 44 ± 1 | 31 ± 1 |
| Calculated Average Residence Time, s | 86 | 48 | 34 |
| Exit Melt Temperature (° C.) | 136 | 141 | 143 |
| Maximum Barrel Temperature (° C.) | 180 | 180 | 180 |
| Peroxide Half Life @ max Barrel Temp, s | 68 | 68 | 68 |

*Amount in parts by weight.
**Weight percent based on weight of functionalized ethylene-based polymer.
***Microgram residual peroxide per gram of functionalized ethylene-based polymer.

TABLE 2D

Experimental Results with Alternate Peroxides at Lower Barrel Temperatures

| | 2-4 | Comp. 2-5 | Comp. 2-6 | 2-7 | Comp. 2-8 | Comp. 2-9 | Comp 2-10 Control |
|---|---|---|---|---|---|---|---|
| Rate [lb/h] | 12.5 | 25 | 37.5 | 12.5 | 25 | 37.5 | |
| Screw Speed, rpm | 500 | 500 | 500 | 500 | 500 | 500 | 500 |
| Barrel Temp, Zone 1, ° C. | 60 | 60 | 60 | 60 | 60 | 60 | 60 |
| Barrel Temp, Zone 2-7, ° C. | 180 | 180 | 180 | 180 | 180 | 180 | 180 |
| Barrel Temp, Zone 9-10, ° C. | 130 | 130 | 130 | 130 | 130 | 130 | 130 |
| AFFINITY GA 1875* | 96.25 | 96.25 | 96.25 | 96.17 | 96.17 | 96.17 | 100 |
| Maleic Anhydride* | 1.8 | 1.8 | 1.8 | 1.8 | 1.8 | 1.8 | |
| MEK* | 1.8 | 1.8 | 1.8 | 1.8 | 1.8 | 1.8 | |
| TRIGONOX 101* | 0 | 0 | 0 | 0 | 0 | 0 | |
| TRIGONOX 117* | 0.15 | 0.15 | 0.15 | 0.23 | 0.23 | 0.23 | |
| Mineral oil* | 0.75 | 0.75 | 0.75 | 1.15 | 1.15 | 1.15 | |
| MAH Graft Content [wt %]** | 0.36 | 0.23 | 0.16 | 0.61 | 0.30 | 0.18 | 0.04 |
| Viscosity (177° C.) [cP] | 8668 | 8368 | 8087 | 11877 | 9448 | 8998 | 6700 |
| PEROXIDE TYPE | TRIGONOX 117 | TRIGONOX 117 | TRIGONOX 117 | TRIGONOX 117 | TRIGONOX 117 | TRIGONOX 117 | blank |
| Residual peroxide [ug/g]*** | 163 | 343 | 390.8 | 228.6 | 416.6 | 530.6 | |
| Minimum Residence Time (s) Average ± SD (n = 3) | 79 ± 2 | 44 ± 1 | 31 ± 1 | 79 ± 2 | 44 ± 1 | 31 ± 1 | |
| Calculated Average Residence Time, s | 86 | 48 | 34 | 86 | 48 | 34 | |
| Exit Melt Temperature, C. | 138 | 141 | 144 | 140 | 142 | 144 | |
| Maximum Barrel Temperature (° C.) | 180 | 180 | 180 | 180 | 180 | 180 | 180 |
| Peroxide Half Life @ max Barrel Temp, s | 19 | 19 | 19 | 19 | 19 | 19 | |

*Amount in parts by weight.
**Weight percent based on weight of functionalized ethylene-based polymer.
***Microgram residual peroxide per gram of functionalized ethylene-based polymer.

Figure 2:
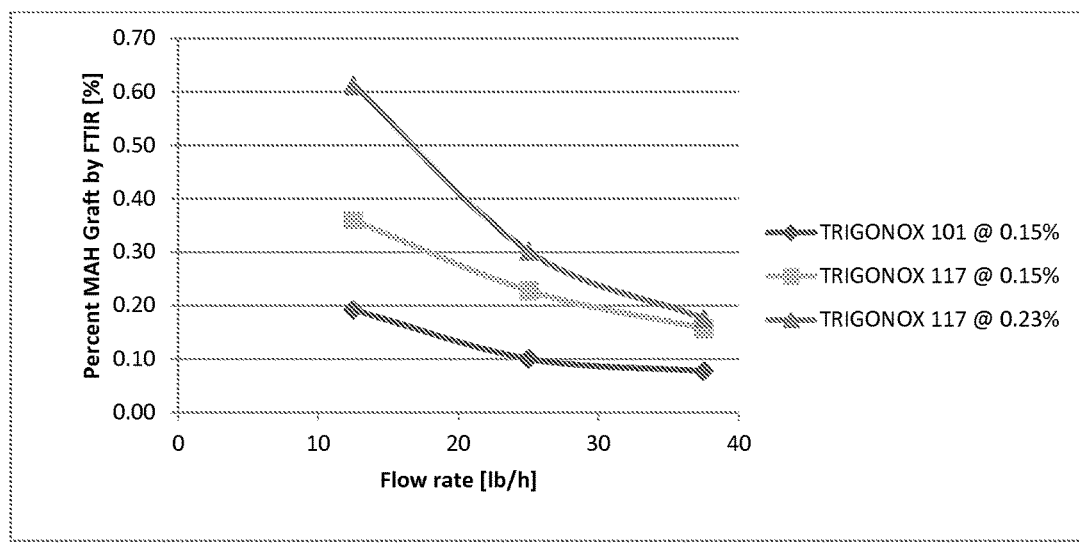
FIG. 2 depicts the percent MAH graft level as a function of peroxide type and flow rate at low barrel temperatures (defined in Tables 2C and 2D).

Table 2-C and Table 2-D show experiments using lower barrel temperatures with TRIGONOX 101 and TRIGONOX 117, respectively. The effect of peroxide type on conversion is shown graphically in FIG. 2 and FIG. 3, at different flow rates. At equal concentration, the samples containing the TRIGONOX 117 peroxide had a higher maleic anhydride graft content than the corresponding samples made with TRIGONOX 101.

The TRIGONOX 117 samples were also run at a higher weight percentage (0.23 weight percent), to account for the number of radicals formed per mole of peroxide. From an activity basis, the "0.23 weight percent" samples of TRIGONOX 117 had the same number of radicals generated as the TRIGONOX 101 samples at "0.15 weight percent." At 10 lb/r rate, the TRIGONOX 117 samples had approximately a "three times higher level" of grafted maleic anhydride. This data demonstrates that the alternative peroxide, TRIGONOX 117, provided a higher grafting efficiency.

Figure 3:
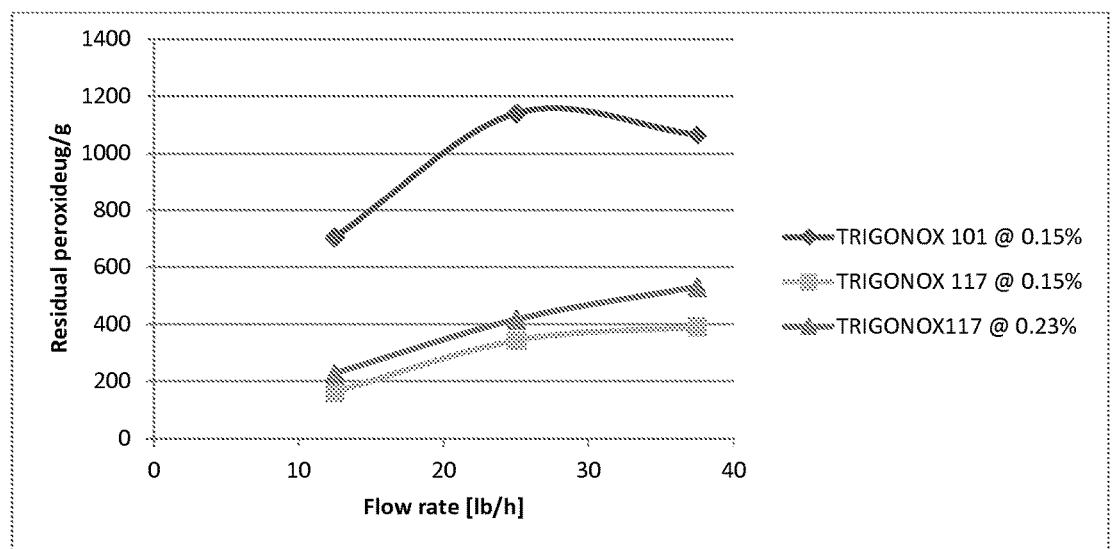
FIG. 3 depicts residual peroxide as a function of peroxide type and flow rate at low barrel temperatures (defined in Tables 2C and 2D).

An alternative response variable to demonstrate the higher reactivity of the peroxide is to measure the amount of unreacted peroxide present in the final solidified sample. FIG. 3 displays the results of the two peroxide types as a function of flow rate. At higher flow rates, lower residence times, the residual peroxide content each of the TRIGONOX 101 samples was always significantly higher than the corresponding TRIGONOX 117 sample. This result shows that a higher proportion of the peroxide from the TRIGONOX 117 decomposed during the residence time of the reactive extrusion process, and was therefore available to initiate polymer grafting.

In summary, the alternative peroxide (TRIGONOX 117) consistently provided a higher level of reaction efficiency at shorter residence times (higher mass flow rates). This provides a means of increasing the rate of grafting at lower temperatures or higher mass flow rates.

The invention claimed is:

1. A process to form a "functionalized ethylene-based polymer" from an ethylene-based polymer and at least one polar compound, said process comprising thermally treating a composition comprising the ethylene-based polymer, the at least one polar compound, and at least one peroxide, in at least one extruder comprising at least one barrel, to form a polymer melt; and wherein the at least one peroxide has a half life, at the maximum barrel temperature of the at least one extruder, of less than 1/4 of the minimum residence time of the polymer melt in the at least one extruder; and wherein the process takes place using a minimum residence time that is less than 1 minute; and wherein the peroxide has a half-life less than 20 seconds (measured at 0.2M peroxide in dodecane), at a temperature from 160° C. to 200° C.; and wherein the temperature of the polymer melt is from 170° C. to 195° C.; and wherein the peroxide decomposes into at least one primary radical selected from the following radicals: ROC(O)O., wherein R is an alkyl.

2. The process of claim 1, wherein the peroxide has a half life, at the maximum barrel temperature of the at least one extruder, of less than 1/5 of the minimum residence time of the polymer melt in the at least one extruder.

3. The process of claim 1, wherein the peroxide decomposes into one or more primary radicals (Z.), and wherein the dissociation energy of each radical is greater than, or equal to, 100 kcal/mole.

4. The process of claim 1, wherein the ethylene-based polymer has a melt viscosity, at 350° F. (177° C.), less than 50,000 cP.

5. The process of claim 1, wherein the peroxide has an SADT from 55° C. to 80° C., based on the pure peroxide.

6. The process of claim 1, wherein the peroxide has a half-life from 0.10 to 2.00 minutes, at a temperature from 160° C. to 190° C.

7. The process of claim 1, wherein the temperature of the polymer melt is from 160° C. to 190° C.

8. The process of claim 1, wherein the ethylene-base polymer is an ethylene/α-olefin interpolymer, and wherein the α-olefin is a $C_3$-$C_{20}$ α-olefin.

9. The process of claim 1, wherein the at least one polar compound is an anhydride-containing and/or carboxylic acid-containing compound.

* * * * *